United States Patent [19]
Katz

[11] 3,737,754
[45] June 5, 1973

[54] STORED ENERGY STABILIZATION SYSTEM
[75] Inventor: Bernard R. Katz, Irvington, N.J. 07111
[73] Assignee: The Lummus Company, Bloomfield, N.J.
[22] Filed: Mar. 19, 1971
[21] Appl. No.: 126,250

[52] U.S. Cl. ..........................320/1, 323/66, 323/93
[51] Int. Cl............................H02j 7/00, H02m 3/00
[58] Field of Search .................320/1; 307/109, 110; 340/173 CA; 323/93, 66

[56] References Cited
UNITED STATES PATENTS
3,659,190 4/1972 Galluppi..............................320/1 X
3,355,719 11/1967 Fox......................................320/1 X
3,348,216 10/1967 Vinson ................................320/1 X Primary Examiner—Bernard Konick
Assistant Examiner—Stuart Hecker
Attorney—Marn & Jangarathis

[57] ABSTRACT

A method of stabilizing the energy stored by a reactive storage device, and the apparatus therefor, are provided in accordance with the teachings of the present invention. The amount of energy depleted from said reactive storage device by the inherent leakage characteristics thereof is determined and additional energy is supplied to said reactive storage device accordingly. A recurrent pulse signal having a period dependent upon the energy stored by the reactive storage device is generated. A change in the period of said recurrent pulse signal is detected by comparing said recurrent pulse signal with reference pulses. The energy stored by the reactive storage device is selectively incremented and decremented in accordance with the comparison of said recurrent pulse signal with said reference pulses.

12 Claims, 11 Drawing Figures

STORED ENERGY STABILIZATION SYSTEM

This invention relates to a method of and apparatus for maintaining a level of stored energy and, in particular, to a method of stabilizing a charge stored on a capacitor and the apparatus therefor.

Conventional techniques for storing energy employ the use of devices for storing the energy of an electrostatic field, devices for storing the energy of a magnetic field, and devices for storing electromagnetic energy. The energy stored may represent information such as that communicated in a data communications system. In the data processing art, useful information may be represented by discrete voltage levels upon which digital processing systems operate, or by analog voltages upon which analog processing systems operate. An illustrative example, typical of the former systems, is the well known digital computer. The data utilized by a digital computer must be stored prior to and during operation thereon. In addition, the program of a digital computer must be retained for the unique functions performed thereby. It is efficacious to store the necessary data and program of a digital computer as characteristic digital voltage levels. Storage devices adapted to store the digital voltage levels must provide an accurate representation thereof for prolonged periods of time. In other words, the inherent properties of the storage device must not alter the digital voltage levels stored thereby so as to produce a representation of aberrant data. Accordingly, multivibrators, shift registers, ferrite cores and other well known storage elements have been developed wherein a digital voltage level may be accurately stored for indefinite periods of time.

The aforementioned devices have produced highly satisfactory results in digital systems. However, their application to analog techniques is unacceptable. In an analog system, information is represented by an instantaneous electrical quantity such, as an amplitude, phase or frequency of a voltage or current, as opposed to an aforementioned digital voltage level. Hence, devices such as multivibrators, which are capable of storing a first or a second voltage level, are not receptive to analog voltages. Accordingly, analog information is stored by analog storage devices, such as capacitance means, which may store a charge representative of the analog information. Capacitance means are extensively used as analog memory devices in analog computer systems. These devices are of compact and inexpensive construction and are adapted to store a charge induced on a plate thereof. The charge stored by a capacitor is directly proportional to a voltage applied thereto and, accordingly, an analog voltage, upon which an operation is to be performed, may be stored by a capacitor until the performance of such operation is completed.

Unfortunately, conventional capacitance means include inherent leakage characteristics whereby the instantaneous amplitude of an analog voltage to be stored by the capacitance means is subject to a gradual reduction. These leakage characteristics may be approximated by a leakage resistance having a high value R such that the instaneous amplitude of a voltage stored by a capacitance means may be determined from the well known equation $$v(t) = V_o e^{-t/RC}$$

where $C$ is the capacitance of the capacitance means, $R$ is the leakage resistance of the capacitance means, $t$ represents the passage of time and $V_o$ is the initial amplitude of the analog voltage to be stored. Thus, it is seen that if a capacitance means is required to store an analog voltage for a prolonged period of time, the information represented by the amplitude of the voltage tends to become distorted and misdescriptive.

Hence, the desirability of maintaining an initial voltage applied to a capacitor is readily apparent. Techniques heretofore utilized by the prior art to stabilize the charge stored on a capacitor have met with varying degrees of success. One such technique applies to the capacitor a voltage having an amplitude that exponentially increases with time to compensate for that portion of the initial voltage that has decayed. However, the circuitry employed to generate this compensating voltage must be matched to the unique characteristics of the capacitor and is not adaptable for universal application. Consequently, a specific compensating circuit must be designed for each storage capacitor to be used. Another technique compensates for the gradual reduction of the voltage stored by a capacitor by periodically applying voltage pulses of a single polarity thereto. An attendant disadvantage with this procedure is the likelihood of overcompensation. If voltage is applied to the capacitor at a rate that exceeds the exponential decrement of voltage, the amplitude of the voltage stored by the capacitor rapidly attains a value in excess of that of the initially applied voltage. Similarly, if voltage is not applied to the capacitor at a sufficient rate, the voltage stored by the capacitor is not adequately compensated. Thus, the capacitor no longer stores an accurate representation of information.

Therefore, it is an object of the present invention to provide a method of maintaining a level of stored energy, and the apparatus therefor.

It is another object of the present invention to provide a method of and apparatus for stabilizing a charge stored on a capacitance means such that said stabilized charge is an accurate representation of information.

It is an additional object of the present invention to provide a method of and apparatus for stabilizing a voltage stored by capacitance means by applying a compensating voltage thereto in accordance with the amount of voltage removed therefrom by the leakage characteristics of said capacitance means.

It is yet another object of the present invention to provide a method of and apparatus for maintaining an accurate representation of information stored by a capacitance means by selectively charging and discharging said capacitance means.

It is still another object of the present invention to provide a method of and apparatus for maintaining a voltage of high tolerance across a capacitor independent of the unique characteristics of said capacitor.

Various other objects and advantages of the present invention will become clear from the following detailed description of an embodiment thereof, and the novel features will be particularly pointed out in connection with the appended claims.

In accordance with this invention, a method of stabilizing a voltage stored by capacitance means and the apparatus therefor, are provided wherein a reduction in voltage resulting from the inherent leakage properties of said capacitance means is determined and further voltages are selectively applied to said capacitance means in accordance with said determined reduction; recurrent pulses having a period dependent upon the voltage stored by said capacitance means are generated and compared with reference pulses having a fixed period; a first voltage is applied to said capacitance means when at least a portion of said recurrent pulses and said reference pulses admit of the same polarity and a second voltage is applied to said capacitance means when at least a portion of said recurrent pulses and said reference pulses admit of opposite polarity.

The invention will be more clearly understood by reference to the following detailed description of an exemplary embodiment thereof in conjunction with the accompanying drawings in which.

Figure 1:
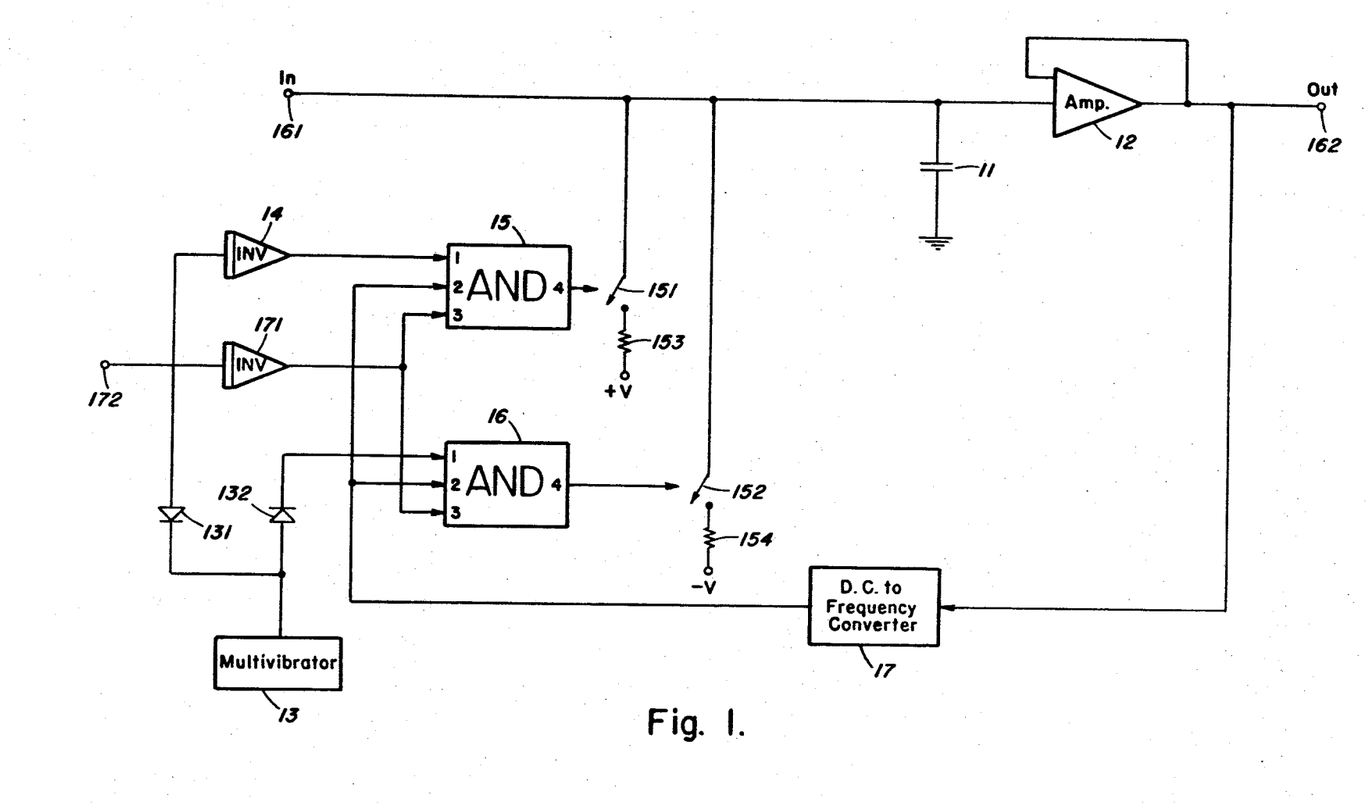
FIG. 1 is a schematic diagram of an embodiment of the present invention.

Referring to the drawings, and in particular, to FIG. 1, there is illustrated a schematic diagram of the present invention comprising capacitance means 11, reference pulse generating means 13, comparator means including coincidence circuits 15 and 16, variable frequency pulse generating means 17 and switch means 151 and 152. Capacitance means 11 is coupled to input terminal 161 and is adapted to store energy supplied to the conducting plates thereof by input terminal 161. It is understood that the energy stored by capacitance means 11 may be supplied by a current source coupled to input terminal 161 or by a voltage source coupled to input terminal 161. Elementary circuit analysis discloses that the energy, $W$, stored by a capacitance means 11 may be expressed in terms of the charge, $Q$, which exists on the conducting plates thereof as $W = Q^2/2C$ where $C$ is the value of capacitance of the capacitance means 11. Alternatively, the energy stored by a capacitance means 11 may be expressed in terms of the voltage $V$ which exists across the conducting plates thereof as $W = CV^2/2$. If the capacitance means 11 is employed in an analog system where the energy stored thereby is representative of information to be utilized, a conventional analog memory element may be comprised of the conventional capacitor-voltage follower circuit illustrated in FIG. 1 wherein amplifying means 12 has an input terminal connected to the common connection of capacitance means 11 and input terminal 161 and additionally includes a simple feedback circuit. Amplifying means 12 may comprise a high gain operational amplifier, well known to those skilled in the art, having a very high input impedance. The simple feedback circuit provided with amplifying means 12 results in a gain of unity for the illustrated memory circuit and the voltage appearing at output terminal 162 of amplifying means 12 is equal to the voltage which exists across capacitance means 11. Amplifying means 12 is provided to isolate capacitance means 11 from further circuitry coupled to output terminal 162 which, it is recognized, would have a deleterious loading effect on capacitance means 11. Hence, amplifying means 12 may be considered as the drive circuitry coupled to a memory capacitance means 11, capable of providing further means with the information stored by capacitance means 11.

Reference pulse generating means 13 is adapted to produce a sequence of rectangular pulses of constant frequency and, therefore, of fixed period. Accordingly, reference pulse generating means 13 may comprise conventional relaxation oscillating means such as an astable, or free-running, multivibrator or a blocking oscillator. Reference pulse generating means 13 is coupled to the comparator means via positively poled diode 132. Diode 132 may be a semiconductor diode having an anode coupled to the output of reference pulse generating means 13 and a cathode coupled to a first input terminal 1 of coincidence circuit 16. Diode 132 is, therefore, adapted to supply coincidence circuit 16 with reference pulses having a positive polarity. Reference pulse generating means is additionally coupled to coincidence circuit 15 of the comparator means via the series circuit comprised of negatively poled diode 131 and phase inversion means 14. Diode 131 may be a semiconductor diode having a cathode coupled to the output of reference pulse generating means 13 and an anode coupled to phase inversion means 14. Phase inversion means 14 is adapted to produce an output signal that is 180° out of phase with respect to an input signal applied thereto. Conventional circuits that perform a phase inverting function are well known in the art and may comprise a polarity inverter, a 180° phase shifter, a split load phase inverter or the like. Accordingly, reference pulses of negative polarity are applied to phase inverting means 14 by diode 131, and reference pulses of positive polarity are supplied to input terminal 1 of coincidence circuit 15 by phase inverting means 14. The latter reference pulses, however, are 180° out of phase with respect to the reference pulses applied to coincidence circuit 16 by diode 132. It is appreciated that if reference pulse generating means 13 is capable of generating constant frequency reference pulses of a single polarity, the necessity of diodes 131 and 132 is obviated. Further, if reference pulse generating means 13 comprises an astable multivibrator, reference pulses appearing at the two output terminals thereof will be 180° out of phase and a first output terminal may be connected directly to a first input terminal 1 of coincidence circuit 16 and a second output terminal may be connected directly to a first input terminal 1 of coincidence circuit 15.

Coincidence circuits 15 and 16 may each comprise a conventional AND gate. One skilled in the art will understand that an AND gate responds to the simultaneous application of signals to each input thereof. Hence, an AND gate is capable of producing a pulse at an output terminal thereof only when pulses supplied to the input terminals thereof coincide in time and polarity. Thus, it is seen that an AND gate is adapted to indicate the degree of concurrence between input pulses. Coincidence circuits 15 and 16 include second input terminals 2, respectively, connected in common to an output terminal of variable frequency pulse generating means 17. In addition, coincidence circuits 15 and 16 each include a third input terminal 3 coupled to terminal 172 via phase inverting means 171 for a purpose subsequently explained. Phase inverting means 171 may be similar to aforedescribed phase inverting means 14 and may comprise polarity inverting means. The output terminal 4 of coincidence circuit 15 is coupled to switch means 151 and the output terminal 4 of coincidence circuit 16 is coupled to switch means 152.

Switch means 151 performs a conventional make-break function whereby a series circuit is completed upon the actuation thereof. Accordingly, switch means 151 may comprise a two-state device admitting of a first state and a second state such that said second state is obtained only when the two-state device is actuated. If switch means 151 comprises a relay circuit including an energizing coil, a movable armature and a fixed contact, the energizing coil may be coupled to output terminal 4 of coincidence circuit 15. Upon energization of the energizing coil, the movable armature will engage the fixed contact of the relay circuit to complete a series circuit therethrough. The movable armature will be disassociated from the fixed contact of the relay circuit when energization of the energizing coil terminates. If switch means 151 comprises a solid state switch means such as a switching transistor or FET device, the energizing electrode such as the base, or equivalent, of the solid state switch means may be coupled to output terminal 4 of coincidence circuit 15. Upon application of a signal of sufficient magnitude to the energizing electrode of the solid state switch means, the impedance between the output, or collector and emitter, terminals thereof will be reduced to a minimal value, to complete a series circuit therethrough. Upon termination of the signal applied to the energizing electrode of the solid state switch means, the impedance between the output terminals thereof resumes its inherently high value to effectively break the series circuit. It is now apparent that switch means 151 may comprise a silicon controlled rectifier or other diode switch means, if desired. The fixed contact of switch means 151, if switch means 151 comprises a relay circuit, or an output terminal of switch means 151, if switch means 151 comprises a solid state switch means, is coupled to a source of positive supply voltage + V via current limiting resistor 153. The movable armature, or its apparent equivalent, of switch means 151 is connected to capacitance means 11. Switch means 152 is similar to switch means 151 and need not be described in detail. The energizing coil, or the energizing electrode, of switch means 152 is coupled to output terminal 4 of coincidence circuit 16. The fixed contact of switch means 152, if switch means 152 comprises a relay circuit, or an output terminal of switch means 152 if switch means 152 comprises a solid state switch means, is coupled to a source of negative supply voltage − V via current limiting resistor 154. The movable armature of switch means 152 is coupled to capacitance means 11 in common relationship with the movable armature of switch means 151.

It has previously been mentioned that variable frequency pulse generating means 17 includes an output terminal coupled to input terminal 2 of coincidence circuits 15 and 16. An input terminal of variable frequency pulse generating means 17 is coupled to capacitance means 11, via amplifying means 12 and is responsive to the voltage which exists across capacitance means 11. Variable frequency pulse generating means 17 is adapted to generate a recurrent pulse signal having a period dependent upon the energy stored by capacitance means 11. Since most analog techniques that employ capacitance means as memory elements utilize the DC voltage stored by the memory element, variable frequency pulse generating means 17 may comprise DC voltage to frequency conversion means whereby the frequency of a pulse signal generated thereby is a function of the magnitude of a DC voltage applied thereto. Hence, the frequency of the pulses generated by variable pulse generating means 17 may vary linearly with the voltage stored by capacitance means 11. For a purpose that will subsequently become clear, the maximum frequency of the pulses produced by variable frequency pulse generating means 17 should be much less than the constant frequency of the reference pulses generated by reference pulse generating means 13. Alternatively, the maximum frequency of the pulses produced by variable frequency pulse generating means 17 may be much greater than the constant frequency of the reference pulses generated by reference pulse generating means 13. If it is assumed, for purposes of explanation, that the frequency of the pulses produced by variable frequency pulse generating means 17 varies linearly from 100 Hz to 10Hz when the voltage applied to variable frequency pulse generating means 17 varies from 10 volts to 1 volt, then the frequency of the reference pulses generated by reference pulse generating means 13 may be 50 KHz. The duty cycles of the pulses generated by variable frequency pulse generating means 17 are preferably not uniform. Indeed, it will be recognized that the pulse width of the pulses generated by variable frequency pulse generating means 17 remains constant regardless of the frequency thereof, and said pulse width should be less than the pulse width of the reference pulses generated by reference pulse generating means 13. It is understood that as the frequency of the pulses generated by variable frequency pulse generating means 17 varies, the period between said pulses varies in an inverse relationship. Accordingly, variable frequency pulse generating means 17 may comprise voltage controlled oscillating means, frequency modulating means, unijunction transistor voltage-sensing circuits and the like. One skilled in the art will recognize that the frequency of the pulses produced by variable frequency pulse generating means 17 may vary from 5,000 Hz to 500 Hz in accordance with the voltage applied thereto; and the frequency of the reference pulses generated by reference pulse generating means 13 may be 10 Hz. In this case, the duty cycles of the pulses generated by variable frequency pulse generating means 17 may be uniform so that the widths of said pulses are determined by the frequency thereof; and the pulse width of each reference pulse generated by reference pulse generating means 13 will be equal and less than the minimal width obtainable by the variable frequency pulses.

Operation of the apparatus of FIG. 1 will now be described with reference to the waveforms illustrated in FIGS. 2A–2F. Initially, it will be assumed that a voltage is applied to input terminal 161 having a magnitude Vo. As aforementioned, most analog techniques employ memory elements such as capacitance means 11 to store information represented by voltage levels. Consequently, capacitance means 11 is charged by the voltage Vo applied to input terminal 161 such that the magnitude of the voltage which exists across capacitance means 11 is equal to Vo. If capacitance means 11 were an ideal element, i.e., if capacitance means 11 was solely a reactive element, the voltage thereacross would remain unchanged at Vo subsequent to the termination of the voltage applied to input terminal 161. However, all commercially available capacitance means inherently include leakage characteristics. In addition, notwithstanding the high input impedance of amplifying means 12, a small offset current is required thereby. Thus, it is seen that leakage currents exist which tend to reduce the charge stored on the capacitance means 11, resulting in a gradual reduction of the magnitude of the voltage stored by capacitance means 11. The voltage which exists across capacitance means 11 is no longer an accurate representation of the information previously applied to input terminal 161; and as the passage of time continues, the inaccuracies increase.

One skilled in the art will recognize that the gradual reduction in the voltage stored by capacitance means 11 may be mathematically represented by the exponential expression $e^{-t/RC}$ where $t$ represents the passage of time, $C$ is the capacitance of capacitance means 11 and $R$ is the equivalent leakage resistance thereof. The unity gain of amplifying means 12 provides the exponentially decaying voltage across capacitance means 11 to appear at output terminal 162. This last mentioned voltage is also applied to variable frequency pulse generating means 17 and modulates the frequency thereof accordingly. FIG. 2 illustrates that the period of the pulses 17' generated by variable frequency pulse generating means 17 changes as the voltage applied to variable frequency pulse generating means 17 by capacitance means 11 is gradually reduced. The period of time between pulses 17' progressively increases (and, therefore, the frequency of the pulses generated by variable frequency pulse generating means 17 decreases) as the magnitude of applied voltage decreases. Hence, the change in the period, or the change in the time of occurrence, of the pulses 17' generated by variable frequency pulse generating means 17 is an indication of the quantity of charge or voltage that has been depleted from the charge or voltage initially stored by capacitance means 11. It is realized that if the voltage which exists across capacitance means 11 is increased, the frequency of the pulses 17' generated by variable frequency pulse generating means 17 increases, and the period between consecutive pulses decreases.

The change in the period of sequential pulses 17' is determined by comparing the time of occurrence of each pulse 17' with a reference pulse. Reference pulse generating means 13 generates the reference pulses 13' of FIG. 2A which are applied to input terminal 1 of coincidence circuit 16 by diode 132. The reference pulses 13' are inverted in phase in the well known manner by diode 131 and phase inverting means 14, and the phase inverted pulses 14' of FIG. 2B are applied to input terminal 1 of coincidence circuit 15. Pulses 17', generated by variable frequency pulse generating means 17, are compared with the reference pulses 13' and 14' to determine the relative times of occurrence of the former pulses, by applying pulses 17' to input terminals 2 of coincidence circuits 15 and 16, respectively. Input terminals 3 of coincidence circuits 15 and 16 are provided with an enabling signal to enable the comparison to occur, as is further described below. Coincidence circuit 15 determines the time of occurrence of pulses 17' with respect to reference pulses 14', and coincidence circuit 16 determines the time of occurrence of pulses 17' with respect to reference pulses 13'. If a pulse 17' coincides with a pulse 13', coincidence circuit 16 produces a pulse 16' as illustrated in FIG. 2E. The latter pulse energizes switch means 152 for a duration equal to the pulse width of pulse 16'. Hence, switch means 152 obtains its second state and a circuit is completed between source of negative supply voltage −V and capacitance means 11. A pulse of negative voltage having a magnitude −V, which may be −18 volts, for example, and a duration equal to the pulse width of pulse 16' is applied to capacitance means 11, thereby decrementing a positive voltage or charge stored by capacitance means 11. Accordingly, the period $P_1$ between pulses 17' increases and the time of occurrence of the next recurrent pulse 17' is determined as just described. If the next sequential pulse 17' coincides with a pulse 13', coincidence circuit 16 again produces pulse 16' and another pulse of negative voltage is applied to capacitance means 11. Thus, the voltage which exists across the capacitance means 11 is further reduced, and amplifying means 12 applies this voltage to variable frequency pulse generating means 17. As is understood, the period $P_2$ between the previously generated pulse 17' and the next recurrent pulse 17' is increased proportionally with the decrease in voltage across capacitance means 11. It may be assumed, then, that the time of occurrence of the next recurrent pulse 17' has been sufficiently shifted whereby pulse 17' coincides with a phase inverted pulse 14'. Coincidence circuit 15 responds to the simultaneous application thereto of pulses 17' and 14', respectively, to produce the pulse 15' of FIG. 2D. Pulse 15' energizes switch means 151 for a duration equal to the pulse width of pulse 15'. Consequently, switch means 151 obtains its second state and a series circuit is established between the source of positive supply voltage +V and capacitance means 11 via current limiting resistor 153 and switch means 151. A pulse of positive voltage having a magnitude +V, which, for example, may be +18 volts, and a pulse width equal to the pulse width of pulse 15' is applied to capacitance means 11, thereby incrementing a positive voltage or charged stored by the capacitance means 11. In accordance with the increase in voltage across capacitance means 11, the period $P_3$ between pulses 17' may decrease and the time of occurrence of the next recurrent pulse 17' is determined as described hereinabove.

It should now be readily apparent that the voltage which exists across capacitance means 11 is incremented or decremented by the apparatus of the present invention in accordance with the quantity of voltage that has been gradually reduced as a result of the leakage characteristics of the capacitance means. As illustrated in FIG. 2F, the voltage waveform 11', which represents the voltage across capacitance means 11, fluctuates about a median value. The median value corresponds to the magnitude at which the voltage across capacitance means 11 is stabilized. It is evident that the time of occurrence of pulse 17' as determined by the stabilized voltage across capacitance means 11 produces no net change in the magnitude of said voltage. Hence, one-half of pulse 17' coincides with reference pulse 13' and one-half of pulse 17' coincides with phase inverted reference pulse 14'. Coincidence circuit 15 produces pulse 15' having a pulse width equal to one-half the pulse width of pulse 17'. As pulse 15' terminates, coincidence circuit 16 produces pulse 16' having a pulse width equal to one-half the pulse width of pulse 17'. Therefore, switch means 151 applies a pulse of magnitude +V to capacitance means 11 and switch means 152 applies a pulse of magnitude −V to capacitance means 11. Consequently, the net change of the voltage which exists across capacitance means 11 is zero, and the exponential decay of said voltage, attributable to the leakage characteristics of capacitance means 11, continues. It is expected that the reduction in voltage stored by capacitance means 11 tends to increase the period $P_4$ of the pulses generated by variable frequency pulse generating means 17 and causes the time of occurrence of the next recurrent pulse 17' to coincide with phase inverted reference pulse 14'. Hence, coincidence circuit 15 produces pulse 15' which energizes switch means 15 to obtain its second state. The voltage across capacitance means 11 is, therefore, incremented by the pulse of positive voltage +V applied thereto by the energized switch means 151 causing the time of occurrence of the next sequential pulse 17' to be altered accordingly, and the foregoing operation is repeated.

Figure 2A:
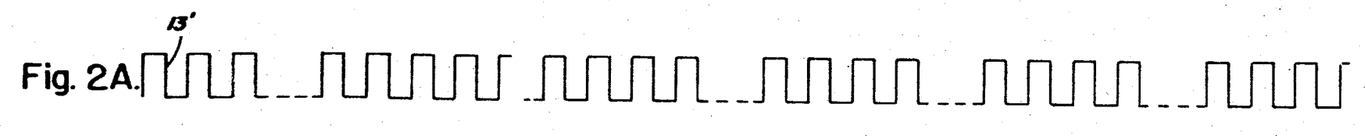
FIGS. 2A-2F illustrate waveforms that are produced by the elements comprising FIG. 1.
Figure 2B:
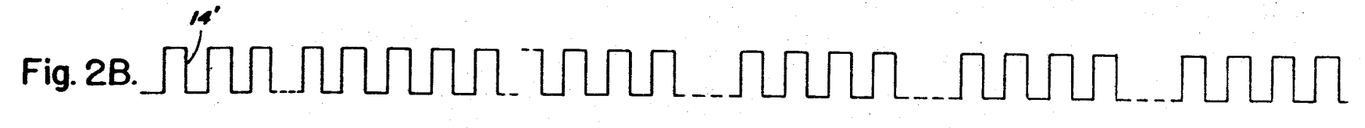
Figure 2C:
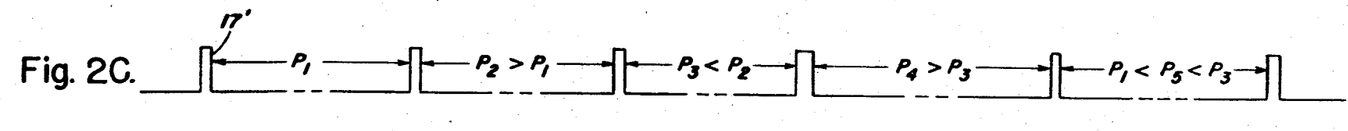
Figure 2D:
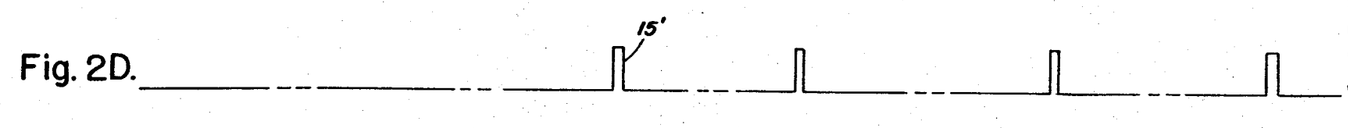
Figure 2E:
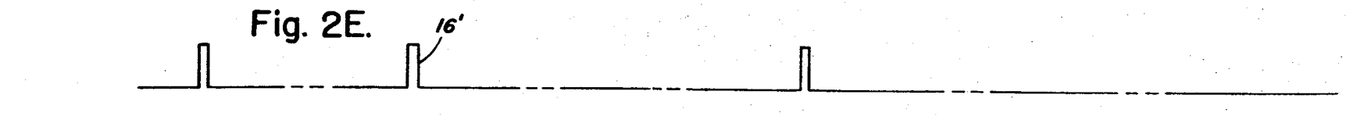
Figure 2F:
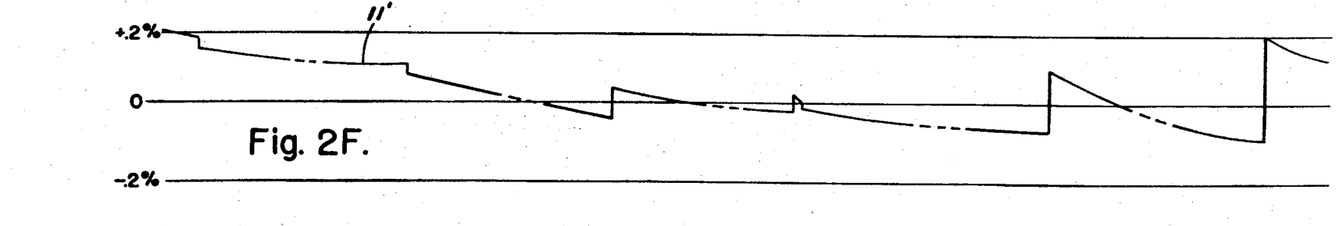

It will be recognized that if the frequency of the pulses produced by variable frequency pulse generating means 17 are chosen to be much greater than the frequency of the reference pulses generated by reference pulse generating means 13, FIGS. 2A and 2C would be interchanged. That is, the reference pulses 13' would be characterized by relatively large constant periods and relatively narrow, constant pulse widths. Similarly, the pulses 17' generated by variable frequency pulse generating means 17 would be characterized by variable periods and symmetrical waveforms. In addition, the pulse width of pulses 17' would always exceed the pulse width of pulses 13'. The apparatus of FIG. 1 would operate substantially as aforedescribed if this modification obtained. The change in the period of the relatively higher frequency pulses 17' may be determined by comparing the time of occurrence of a pulse 17' with a reference pulse 13'. It is apparent that the waveforms illustrated in FIGS. 2D through 2F are applicable to the just described modifications of the present invention.

One skilled in the art will appreciate that it is preferred to suspend the operation of the apparatus of FIG. 1 when capacitance means 11 is provided with supplementary information. This is expeditiously accomplished by inhibiting the energization of switch means 151 and 152 while capacitance means 11 is charged to a further voltage level by the application of energy to input terminal 161. Accordingly, when a voltage representative of information to be stored is applied to input terminal 161, a disable signal of positive polarity and of sufficient duration is applied to terminal 172. Inverting means 171 inverts the polarity of the disable signal (which, it is understood, is equivalent to inverting the phase thereof) and applies a signal of negative polarity to input terminals 3 of coincidence circuits 15 and 16, respectively. It is clear that a signal of negative polarity inhibits coincidence circuits 15 and 16 from providing output pulses, and switch means 151 and 152 are inhibited from obtaining their second states, respectively, throughout the continuance of the disable signal. Upon termination of the disable signal, terminal 172 has applied thereto a quiescent signal of negative polarity, or, if desired, ground potential. Inverting means 171 responds to the quiescent signal and provides a signal of positive polarity to input terminals 3 of coincidence circuits 15 and 16, respectively. This signal of positive polarity enables coincidence circuits 15 and 16 to respond to the pulse signals applied to their respective input terminals 1 and 2 in the manner aforedescribed. However, the operation of the apparatus of FIG. 1 need not be suspended as aforedescribed if the impedance of the source of information coupled to input terminal 161 is of a suitably low value. Hence, input terminal 172 and inverting means 171, may, if desired, be omitted.

It is understood that the frequency ranges of the pulses generated by variable frequency pulse generating means 17 and the pulses generated by reference pulse generating means 13 are not to be limited by the exemplary values set forth above. A graphical representation of the frequency of the pulses generated by variable frequency pulse generating means 17 as determined by the voltage applied thereto may be linear or non-linear. If desired, such graphical representation may conform to the exponential decrease of the voltage stored by capacitance means 11, as determined by the leakage characteristics of the capacitance means. To illustrate the high tolerance obtained by the present invention, it will be assumed that a voltage of 10 volts is applied to capacitance means 11. Accordingly, the frequency of the pulses generated by variable frequency pulse generating means 17 may be 100 Hz. As is now understood, the gradual reduction of the voltage stored by capacitance means 11 is indicated by a corresponding reduction of the frequency of the pulses generated by variable frequency pulse generating means 17. The time of occurrence of the next recurrent pulse generated by variable frequency pulse generating means 17 is, therefore, shifted. However, the apparatus of FIG. 1 is adapted to maintain the voltage which exists across capacitance means 11 at a value which corresponds to the aforementioned stabilized voltage magnitude. In other words, the maximum deviation in the time of occurrence of a pulse generated by variable frequency pulse generating means 17 is limited to $W_2-W_1/2$ where $W_1$ is the pulse width of a pulse generated by variable frequency pulse generating means 17 and $W_2$ is the pulse width of a reference pulse generated by reference pulse generating means 13. Hence, if the leading edge of a first pulse generated by variable frequency pulse generating means 17 coincides with the leading edge of a reference pulse generated by reference pulse generating means 13, the deviation of the time of occurrence of the next succeeding pulse generated by variable frequency pulse generating means 17 is constrained so that the midpoint of said next succeeding pulse may coincide with the trailing edge of a reference pulse generated by reference pulse generating means 13. It is, of course, understood that if capacitance means 11 stores a maximum voltage of 10 volts, variable frequency pulse generating means 17 generates pulses of a maximum frequency of 100Hz. But the frequency of the reference pulses may be 50KHz, which is 500 times greater than the frequency of the pulses generated by variable frequency pulse generating means 17. Accordingly when capacitance means 11 stores a maximum voltage, the period of the pulses generated by variable frequency pulse generating means 17 will not change by more than 100/50,000 or 0.2 percent of its initial value. Correspondingly, a voltage of 10 volts initially applied to capacitance means 11 will be stabilized at 0.2 percent of its maximum value, or at 9.98 volts. Thus, it is seen that the voltage stored by capacitance means 11 will be maintained at a value that does not differ from an initial value by more than 0.02 volts. Of course, if a minimum voltage of 1 volt is applied to capacitance means 11, the voltage stored by capacitance means 11 will be maintained at 0.98 volts, or 2 percent of the initial value.

Figures 3, 4C:
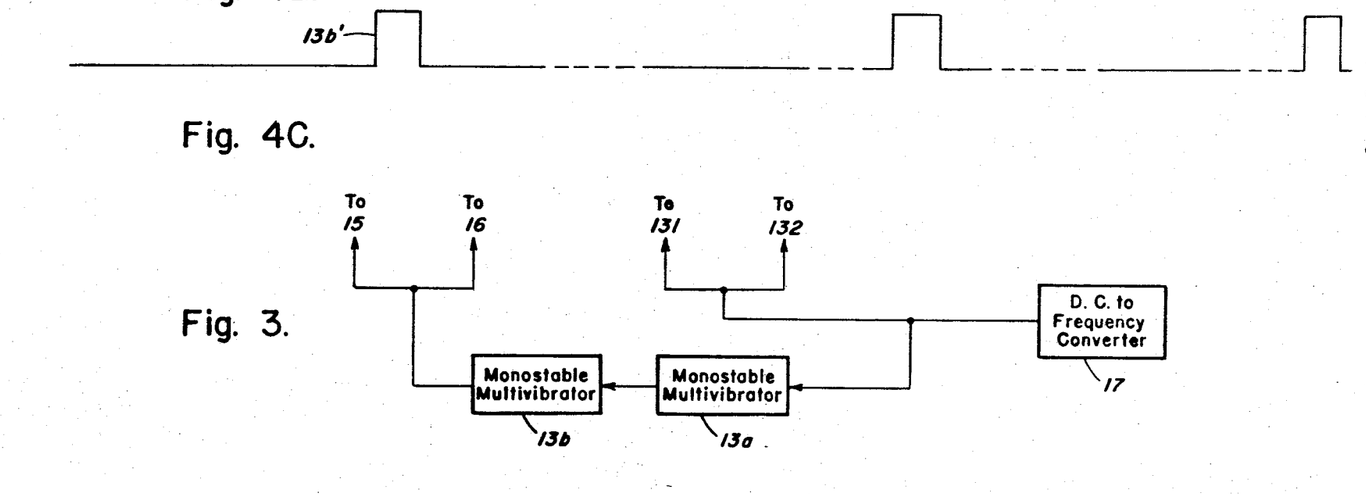
FIG. 3 is a schematic diagram of another embodiment of the present invention.
FIGS. 4A-4C illustrate waveforms that are produced by the elements comprising FIG. 3.

Another embodiment of the reference pulse generating means 13 is illustrated in FIG. 3 which comprises first monostable multivibrator means 13a, second monostable multivibrator means 13b and variable frequency generating means 17. First monostable multivibrator means 13a is coupled to variable frequency pulse generating means 17 and is adapted to produce a pulse of constant pulse width upon detecting the trailing edge of a pulse applied thereto. Accordingly, monostable multivibrator means 13a admits of a stable state and a quasi-stable state and may comprise a conventional tunnel diode monostable circuit, a unijunction transistor circuit, or the like. The monostable multivibrator means 13a is capable of being triggered to and maintaining its quasi-stable state for a first predetermined interval of time. The monostable multivibrator means 13b is coupled to and is similar to monostable multivibrator means 13a and is adapted to be triggered to and to maintain its quasi-stable output state for a second predetermined interval of time. An output of monostable multivibrator means 13b may be fed back to monostable multivibrator means 13a to inhibit the latter from being triggered to its quasi-stable state when the former obtains its quasi-stable state. However, the first and second predetermined intervals of time may be particularly selected as will soon be described, whereby the aforementioned feedback is omitted. The variable frequency pulse generating means 17 has been explained hereinabove, and is adapted to generate pulses of variable frequency and uniform duty cycle.

Figures 4A, 4B:
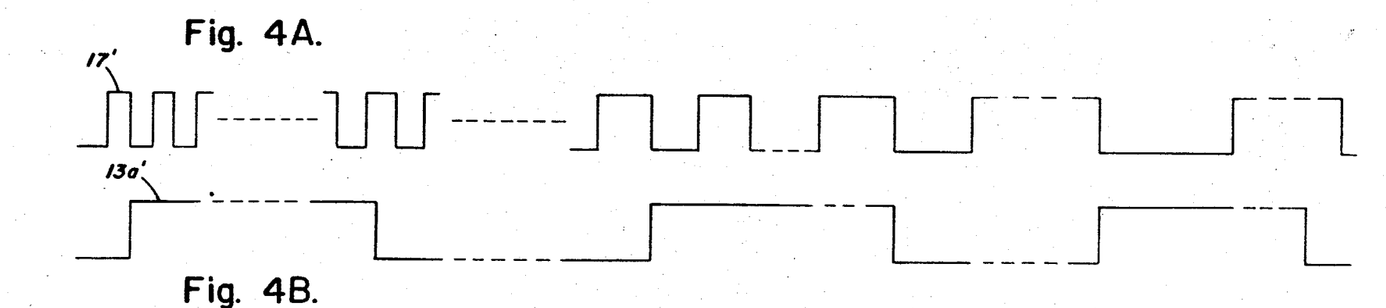

The operation of the apparatus of FIG. 3 will be described with reference to the waveforms illustrated in FIGS. 4A through 4C. For purposes of explanation it will be assumed that monostable multivibrator means 13a is capable of being triggered to its quasi-stable state to produce a pulse of 100 milliseconds duration, and the monostable multivibrator means 13a is not responsive to triggering signals supplied thereto when it assumes its quasi-stable state. It will be further assumed that monostable multivibrator means 13b is capable of producing a pulse admitting of 200 microseconds duration. Finally, the frequency of the pulses generated by variable frequency pulse generating means 17 may vary from 5,000 Hz to 500 Hz in accordance with the voltage applied thereto. It should be obvious that the foregoing values are merely exemplary and are not to be interpreted as limiting the present invention thereto.

The trailing edge of a pulse applied to monostable multivibrator means 13a by variable frequency pulse generating means 17 is effective to trigger said monostable multivibrator means to its quasi-stable state. Accordingly a pulse of 100 milliseconds duration is produced. At the conclusion of the 100 milliseconds the pulse produced by monostable multivibrator means is 13a terminates and the trailing edge thereof triggers monostable multivibrator means 13b to produce a reference pulse of 200 microseconds duration. Coincidence circuits 15 and 16 of FIG. 1 compare the relative times of occurrence of the pulses of variable frequency with the reference pulses as aforedescribed. If the voltage applied to variable frequency pulse generating means 17 is 10 volts, the frequency of the pulses generated thereby is 5,000 Hz. The trailing edge of a 5,000 Hz pulse triggers monostable multivibrator means 13a and a reference interval of 100 milliseconds represented by pulse 13a', is commenced. At the conclusion of the reference interval, a 200 microsecond reference pulse 13b' is generated. It is understood that, during the reference interval, the voltage applied to variable frequency pulse generating means 17 may be gradually reduced. Accordingly, the frequency of the pulses 17' is decreased so that the period thereof is now greater than 200 microseconds and the trailing edge of pulse 13a' does not coincide with a trailing edge of a pulse 17'. Hence, the change in the time of occurrence of the pulses 17' at the termination of the reference interval is an indication of the quantity of voltage that has been depleted from the capacitance means 11 during said reference interval. The amount of change may be determined by comparing the reference pulse 13b' with the generated pulse 17' at the conclusion of the reference interval and the voltage stored by capacitance means 11 may be properly adjusted. It is clear that the length of time during which the voltage stored by capacitance means 11 may vary is equal to the reference interval or 100 milliseconds, and the maximum variation of voltage will change the effective time of occurrence of the pulses 17' by one period, or 0.2 milliseconds. Hence, the voltage stored by capacitance means 11 will not change by more than 0.2/100 or 0.2 percent of its initial value.

If now the voltage applied to variable frequency pulse generating means 17 results in the generation of pulses of, say 2,000 Hz, at the conclusion of the 100 millisecond reference interval, the frequency of pulses 17' is decreased so that the period thereof is now greater than 500 microseconds, and the trailing edge of pulse 13a' does not coincide with a trailing edge of a pulse 17'. The amount of change in the period of pulses 17' may be determined by comparing the reference pulse 13b' with the generated pulse 17' at the conclusion of the reference interval as aforedescribed, and the voltage stored by capacitance means 11 may be properly adjusted. One skilled in the art will recognize that the foregoing explanation is applicable when variable frequency pulse generating means 17 generates pulses admitting of a minimum frequency, such as 500 Hz. Accordingly, further description need not be necessary. Thus, it is seen that the voltage stored by capacitance means 11 is periodically sampled and properly adjusted. The period of sampling is adapted to be automatically increased or decreased in accordance with the magnitude of the stored voltage so that the voltage stored by capacitance means 11 will be maintained at a value that does not differ from an initial value by more than 0.02 volts.

While this invention has been particularly shown and described with reference to a specific embodiment thereof, it will be obvious to those skilled in the art that various changes and modifications in form and details may be made without departing from the spirit and scope of the invention. It is, therefore, intended that the appended claims be interpreted as including all such changes and modifications.

What is claimed is:

1. A method of stabilizing a charged stored on a capacitance means comprising the steps of:
   providing a charge on said capacitance means;
   generating a recurrent pulse signal, the period of said recurrent pulse signal being dependent upon the charge stored on said capacitance means;
   determining the quantity of charge depleted from said charge provided on said capacitance means by comparing said generated recurrent pulse signal with a reference pulse signal, said reference pulse signal having a substantially constant period; and selectively incrementing and decrementing the charge stored on said capacitance means in accordance with said comparison.

2. The method of claim 1 wherein said step of generating a recurrent pulse signal comprises the steps of:
producing a voltage signal proportional to the charge stored on said capacitance means;
applying said produced voltage signal to variable frequency pulse generating means; and
modulating the frequency of the pulses generated by said variable frequency pulse generating means in accordance with said produced voltage.

3. The method of claim 2 wherein said step of comparing said generated recurrent pulse signal with a reference pulse signal comprises the steps of:
determining the coincidence of polarity of the pulses produced by said variable frequency pulse generating means and the reference pulses of said reference pulse signal; and
determining the opposition of polarity of said pulses produced by said variable frequency pulse generating means and the reference pulses of said reference pulse signal.

4. The method of claim 3 wherein said step of selectively incrementing and decrementing the charge stored on said capacitance means comprises the steps of:
applying a negative voltage to said capacitance means when at least a portion of a pulse produced by said variable frequency pulse generating means coincides with at least a portion of a reference pulse of like polarity; and
applying a positive voltage to said capacitance means when at least a portion of a pulse produced by said variable frequency pulse generating means coincides with at least a portion of a reference pulse of opposite polarity.

5. Apparatus for maintaining a level of stored energy comprising:
capacitance means including inherent leakage characteristics; said capacitance means being adapted to store energy supplied thereto;
means coupled to said capacitance means for providing energy to be stored by said capacitance means;
pulse generating means coupled to said capacitance means for producing recurrent pulses of constant pulse width, the period of said recurrent pulses being dependent upon the level of energy stored by said capacitance means;
reference pulse means for providing periodic reference pulses of constant frequency;
comparator means coupled to said pulse generating means and said reference pulse means for indicating the difference between the energy provided by said means for providing energy and the energy stored by said capacitance means; and
switch means coupled to said comparator means for selectively applying energy to and removing energy from said capacitance means in accordance with said indications.

6. Apparatus for maintaining a level of stored energy in accordance with claim 5 wherein said pulse generating means comprises voltage controlled oscillating means responsive to a voltage applied thereto, said voltage representing the level of energy stored by said capacitance means, whereby the frequency of the pulses produced by said voltage controlled oscillating means is adapted to vary directly with said voltage applied thereto, and the pulse width of said pulses produced by said voltage controlled oscillating means is less than the pulse width of said periodic reference pulses.

7. Apparatus for maintaining a level of stored energy in accordance with claim 6 wherein said reference pulse means comprises:
relaxation oscillating means for producing sequential rectangular pulses having a constant frequency greater than the maximum frequency obtainable by the pulses produced by said voltage controlled oscillating means; said relaxation oscillating means including an output terminal; and
phase inversion means coupled to said output terminal of said relaxation oscillating means for producing phase inverted sequential rectangular pulses in response to said sequential rectangular pulses supplied by said relaxation oscillating means, whereby said comparator means is supplied with at least one of said sequential rectangular pulses and said phase inverted sequential rectangular pulses.

8. Apparatus for maintaining a level of stored energy in accordance with claim 7 wherein said comparator means comprises:
first coincidence means including a first input terminal coupled to said voltage controlled oscillating means, a second input terminal coupled to said output terminal of said relaxation oscillating means and an output terminal; whereby a pulse is produced by said first coincidence means when at least a portion of a pulse produced by said voltage controlled oscillating means coincides with at least a portion of a pulse produced by said relaxation oscillating means; and
second coincidence means including a first input terminal coupled to said voltage controlled oscillating means, a second input terminal coupled to said phase inversion means and an output terminal; whereby a pulse is produced by said second coincidence means when at least a portion of a pulse produced by said voltage controlled oscillating means coincides with at least a portion of a pulse produced by said phase inversion means.

9. Apparatus for maintaining a level of stored energy in accordance with claim 8 wherein said switch means comprises:
first two-state means admitting of a first state and a second state coupled to said output terminal of said first coincidence means, such that said first two-state means obtains its second state when a pulse is produced by said first coincidence means; whereby said capacitance means is coupled to a voltage of a first polarity when said first two-state means obtains said second state; and
second two-state means admitting of a first state and a second state coupled to said output terminal of said second coincidence means such that said second two-state means obtains its second state when a pulse is produced by said second coincidence means; whereby said capacitance means is coupled to a voltage of a second polarity when said second two-state means obtains said second state.

10. Apparatus for maintaining a level of stored energy in accordance with claim 9 wherein said first and second coincidence means further include third input terminals, respectively, connected in common and adapted to be supplied with a control signal such that when said capacitance means is provided with energy to be stored thereby by said means coupled to said capacitance means, said control signal is supplied to said third input terminals whereby said first and second coincidence means are inhibited from producing pulses.

11. A circuit for stabilizing a voltage stored by a storage capacitor, the magnitude of said voltage being subject to a gradual reduction resulting from inherent leakage characteristics of said storage capacitor, comprising:

variable frequency pulse generating means coupled to said storage capacitor and responsive to the voltage stored thereby for generating pulses having a frequency determined by said voltage;

reference pulse generating means for generating pulses having a substantially constant frequency;

phase inversion means coupled to said reference pulse generating means for inverting the phase of said pulses generated by said reference pulse generating means;

first coincidence determining means coupled to said variable frequency pulse generating means and said reference pulse generating means for determining the coincidence of said pulses generated by said variable frequency pulse generating means and said pulses generated by said reference pulse generating means;

second coincidence determining means coupled to said variable frequency pulse generating means and said phase inversion means for determining the coincidence of said pulses generated by said variable frequency pulse generating means and said pulses inverted by said phase inversion means;

first switch means coupled to said first coincidence determining means for selectively applying a first voltage to said storage capacitor when a pulse generated by said variable frequency pulse generating means coincides with a pulse generated by said reference pulse generating means; and second switch means coupled to said second coincidence determining means for selectively applying a second voltage to said storage capacitor when a pulse generated by said variable frequency pulse generating means coincides with a pulse inverted by said phase inversion means.

12. Apparatus for maintaining a level of stored energy, comprising:

energy storage means exhibiting inherent leakage characteristics whereby the energy stored by said energy storage means is adapted to be gradually reduced;

variable frequency pulse generating means coupled to said energy storage means for generating pulses admitting of a frequency dependent upon the level of energy stored by said energy storage means;

reference interval generating means coupled to said variable frequency pulse generating means for defining a predetermined reference interval in response to a pulse applied thereto by said variable frequency pulse generating means, said predetermined reference interval extending over a plurality of pulse periods;

reference pulse means coupled to said reference interval generating means for providing a reference pulse of predetermined duration at the conclusion of said predetermined reference interval;

comparator means coupled to said variable frequency pulse generating means and said reference pulse means for determining a change in the period of said generated pulses during said predetermined reference interval, whereby said change in said period is a function of the gradual reduction of the energy stored by said energy storage means; and means coupled to said comparator means for selectively applying energy to and removing energy from said energy storage means in accordance with said determinations.

* * * * *